United States Patent
Andrews, Jr.

(10) Patent No.: US 7,895,021 B1
(45) Date of Patent: Feb. 22, 2011

(54) METHOD OF SENSOR DISPOSITION

(75) Inventor: George A. Andrews, Jr., Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 724 days.

(21) Appl. No.: 11/820,038

(22) Filed: Jun. 12, 2007

Related U.S. Application Data (60) Provisional application No. 60/813,437, filed on Jun. 13, 2006.

(51) Int. Cl.
*G06F 7/60* (2006.01)
*G06G 7/48* (2006.01)

(52) U.S. Cl. ................. 703/2; 703/11; 703/12

(58) Field of Classification Search .......... 703/9, 703/11, 12; 700/266
See application file for complete search history.

(56) References Cited

U.S. PATENT DOCUMENTS

| | | | | |
|---|---|---|---|---|
| 6,009,357 | A | 12/1999 | Wellman et al. | 701/23 |
| 6,415,272 | B1 | 7/2002 | Ulyanov | 701/106 |
| 6,957,200 | B2 * | 10/2005 | Buczak et al. | 706/13 |
| H2208 | H * | 1/2008 | Stytz et al. | 703/12 |
| 7,542,884 | B2 * | 6/2009 | Boris et al. | 703/2 |
| 2006/0204107 | A1 * | 9/2006 | Dugan et al. | 382/217 |
| 2006/0233485 | A1 | 10/2006 | Allen | 185/13 |

OTHER PUBLICATIONS

Obenschain et al., Using CT-Analyst to optimize sensor placement, 2004, Proc. SPIE, vol. 5416, pp. 14-20.*

Akkaya et al., COLA: A Coverage and Latency aware Actor Placement for Wireless Sensor and Actor Networks, Fall 2006, Proceedings of IEEE Vehicular Technology Conference.*

J. Carrano (study chair), *Chemical and Biological Sensor Standards Study*, DARPA, 2004, http://www.darpa.mil/mto/publications/pdf/cbsss.pdf.

E. van Nimwegen et al., "Statistical Dynamics of the Royal Road Genetic Algorithm", *Theoretical Computer Science*, v. 229, iss. 1-2, pp. 41-102, Nov. 1999 http://www.santafe.edu/research/publications/workingpapers/97-04-035.pdf. and http://citeseer.ist.psu.edu/cache/papers/cs/4160/http:zSzzSzwww.inet.gda.plzSzaizSzwww.santafe.eduzSzprojectszSzeveazSzStatDynRRGA.pdf/vannimwegen9Sstatistical.pdf.

(Continued)

*Primary Examiner*—Paul L Rodriguez
*Assistant Examiner*—Aniss Chad
(74) *Attorney, Agent, or Firm*—Gerhard W. Thielman Esq.

(57) ABSTRACT

A process is provided for disposing a sensor in an environment for optimally obtaining characteristic measurements. The process includes modeling covariant sets of environment elements that correspond to conditions of the environment and of sensor elements that correspond to characteristic functionalities of the sensor. The process further includes covariantly coupling the environmental elements with the sensor elements to produce a third set of configuration elements; and combining the configuration elements to obtain a fitness function parameter. The process may additionally include adjusting the environment elements and the sensor elements; repeating operations for covariantly coupling and combining until obtaining the fitness function parameter over a defined region of the environment within a set of fitness function parameters. Also, the process may include determining an extreme value within the set of fitness function parameters, which may also include optimizing the fitness function parameter as an optimum value with a genetic algorithm over the set of fitness function parameters.

18 Claims, 3 Drawing Sheets

OTHER PUBLICATIONS

C. M. Reidys et al., "Combinatorial Landscapes", *SIAM Review*, v. 44, iss. 1, pp. 3-54, 2002.

J. B. Boris, "Dust in the Wind: Challenges for Urban Aerodynamics", AIAA Paper 2005-5393, pp. 1-63. http://www.lep.nrl.navy.mil/et-analyst/Technical_Documents_files/DITW_AIAA.pdf.

J. Pullen et al., "A comparison of contaminant plume statistics from a Gaussian puff and urban CFD model for two large Cities", Atmospheric Environment, 39, 1049-1068. http://www.theworldisyourocean.net/papers/2005ae.pdf.

J. P. Boris et al., "CT-Analyst™: Fast and Accurate CBR Emergency Assessment", Proceedings of the $2^{nd}$ International Conference on Battle Management, Nov. 2002. http://www.hpce-usa.org/pics/03-pres/boris.pdf.

J Boris et al., "Fast and Accurate prediction of windborne contaminant plumes for civil defense in cities", CWE2010. http://www.dtic.mil/cgi-bin/GetTRDoc?Location=U2&doc=GetTRDoc.pdf&AD=ADA524039.

\* cited by examiner

METHOD OF SENSOR DISPOSITION

CROSS REFERENCE TO RELATED APPLICATION

Pursuant to 35 U.S.C. §119, the benefit of priority from provisional application 60/813,437, with a filing date of Jun. 13, 2006, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to sensor placement in a fluid flow-field. In particular, the invention relates to integration of cellular automata and a genetic search algorithm together with a fitness landscape.

Measuring pressure and velocity characteristics in an environment that may include boundary layer separation requires careful disposition of instrument sensors in order to adequately characterize the flow-field phenomena. Placement of sensors involves evaluation of types and capabilities of sensors, as well as the environment whose characteristics are to be measured. These sundry considerations can represent a significant challenge, particularly for optimization by minimizing the quantity and intrusiveness of the instrumentalities being employed.

SUMMARY

Conventional procedures for sensor displacement yield disadvantages addressed by various exemplary embodiments of the present invention. In particular, the process disclosed herein provides for disposing a sensor in an environment for optimally obtaining characteristic measurements. The embodiments include modeling covariant sets of environment elements that correspond to conditions of the environment and of sensor elements that correspond to characteristic functionalities of the sensor. The embodiments further include covariantly coupling the environmental elements with the sensor elements to produce a third set of configuration elements; and combining the configuration elements to obtain a fitness function.

Other various embodiments alternatively or additionally provide for adjusting the environment elements and the sensor elements; repeating operations for covariantly coupling and combining until obtaining the fitness function over a defined region of the environment within a set of fitness function parameters. Additionally, other various embodiments alternatively or additionally provide for determining an extreme value within the set of fitness function parameters, which may also include optimizing the fitness function as an optimum value with a genetic algorithm over that set.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

As provided by the embodiments to be described, a suite of three algorithms provide a software capability to optimize selection, placement and orientation of a sensor in a flow-field. A threat detector for platform or area protection represents an application example. Two of the algorithms are established in the applied mathematics community, entailing a cellular automata based fluid model and a genetic search algorithm.

A third algorithm involves the concept of a fitness landscape, discussed in detail herein, heretofore unknown to sensor placement and thus novel to such applications. In this disclosure, the terms optimized and optimal in the colloquial sense connote a maximized or maximal state, respectively. Thus, the sensor placement problem generically is recognized to represent a constrained optimization problem leading to sub-optimal solutions.

A 2004 DARPA report on sensor metrics, *Chemical and Biological Sensor Standards Study*, included findings that (a) sensor requirements are ill defined, (b) sensors need to have multiple operating modes allowing variability in sensor capabilities to meet operational needs, (c) testing and characterization is outdated, and (d) receiver operating characteristic (ROC) curves are essential for development, testing and evaluation of chemical-biological sensors. The report concluded that sensor performance characterization is most meaningful when done with the sensor operating in a real-world environment. However, the report also acknowledged that the ideal of generating ROC curves requires "a very large amount of field data, which is [sic] difficult and expensive to acquire" (p. 10). The report further identified the key sensor metrics of sensitivity, probability of correct detection, false positive rate and response time.

Artisans of ordinary skill in the art will recognize that ROC curves represent a graphical measure of sensitivity for binary discrimination. Such ROC curves may be used to represent ratios between rates of true positives (a condition correctly categorized as satisfying the threshold) and false positives (a condition incorrectly categorized as satisfying the threshold).

These may be mapped into ROC space as a predictive mechanism of correct categorization.

A sensor's performance depends upon the following broad areas: 1) Operational environment; 2) Innate sensor design; and 3) Sensor-environment interface or coupling (sampling efficiency). A software tool, as disclosed herein, addresses these performance areas in an integrated fashion through a suite of algorithms that incorporate sensor design functions, environmental functions and a novel approach that characterizes the coupling efficiency and design functionalities of the sensor. This approach may be termed simulated performance. The algorithm is completely generic and as such can fundamentally address the performance characteristics implicit in ROC curves.

Outputs of this algorithm are optimized sensor type selection for given environments and optimized sensor placement around objects for monitoring air quality. Consequently, the procedure provides a capability that can have important applications in industry, fire protection, and chemical, biological and radiological (CBR) defense.

The procedure is iterative, as described further herein. In particular, a value may be assigned to the different possible configurations by employing a concept—inspired by theoretical biology—known as fitness. In summary, the fitness of a biological species determines its ability to survive and pass on its genetic pool to subsequent generations (i.e., its performance). Naturally, its survivability depends upon its innate compatibility with its local environment and its ability to adapt to environmental changes.

In theoretical biology, fitness has been mathematically abstracted by introducing the concept of a fitness function that plays the role of a genome (string of genetic information) whose variations due to mutation or mating generate a fitness landscape. In the parlance of genetics, a fitness landscape abstracts the concept of phenotypic plasticity, where high plasticity implies strong environmental consequences reflected in the genotypes or phenotypes and fitness translates to enhanced replication rates. See e.g., C. M. Readys et al., "Combinatorial Landscapes", *SIAM Review*, v. 44, iss. 1, pp. 3-54, 2002.

Mathematically, a fitness landscape is a locus of points (e.g., a surface if the function is continuous) that is composed of mappings of each and every variation of the state vector onto the real numbers. This mapping quantifies value or fitness. As an example, the Royal Roads Fitness Function (RRFF) may be applied to this concept of the sensor placement problem. See e.g., E. van Nimwegen et al., "Statistical Dynamics of the Royal Road Genetic Algorithm", *Theoretical Computer Science*, v. 229, iss. 1-2, pp. 41-102, November 1999. The RRFF consists of a state vector (genome) of 1s and 0s (genes).

By simply summing all of the elements (the fitness map), a numerical value (e.g., an integer) can be obtained that may be interpreted as a measure of fitness. Thus, by changing or rearranging any of the 1s or 0s, a new fitness can be determined and compared. There exists possibility for equal valued finesses; this is termed neutrality. The collection of all fitness values associated with all elemental variations constitutes (in this case discrete) the fitness landscape.

The concept of a fitness landscape thus traces back to Darwin's seminal notion of natural selection and is the biological analogue of a cost or utility function found in optimization theory. It provides a conceptually simple way to account for environmental effects upon the dynamical states of systems when exposed to changing conditions. In complexity-theoretic language, the environment affects a top-down influence upon the system elements favoring particular elemental configurations. Conversely—and equally important—is the idea that the individual elements have a collective bottom-up effect upon their host environment as well.

This mutual coupling between scales has profound consequence throughout the sciences and constitutes the essence of complexity theory. Accordingly, fitness landscapes have found ubiquitous utility in analyzing the global dynamics of many-body and complex systems. Landscape theory also provides opportunities for study in many fields of applied and pure mathematics; e.g., combinatorial enumeration, discrete and continuous topology, as well as graph theory.

Various exemplary embodiments utilize the concept of a fitness landscape that characterizes both the coupling of sensors to their local environment as well as the design and/or selection of appropriate sensors for given environmental conditions. The first component of the software suit thus involves simulating the environment. Toward this objective, a cellular automata (CA) based flow module may be provided to simulate bulk flow around mobile and stationary structures for varying meteorological conditions.

CA represents a mature technique that has been developed and applied in academic and industrial circles and has fostered understanding in such diverse fields as crack formation-and-propagation, traffic flow, fluids engineering, and biosystems, among others. Computational fluid dynamics (CFD), Lagrangian particle, or Gaussian-puff predictions and/or direct measurement can be used to characterise envionment as well. A genetic algorithm such as simulated annealing can be used to perform global optimization on the multi-modal FLS.

The algorithmic suite may include the following four modules: cellular automata (CA), fitness landscape, genetic algorithm and interface.

I. Cellular automata (CA) module. Existing or developed CA bulk-flow capabilities may be employed as the inherent local nature of CA uniquely affords the possibility of changing simulation parameters and observing subsequent transient responses without the need for grid generation or restarting the simulation. The code can be written in modular form using open architecture principles so as to afford ease for future modifications or interfacing with other techniques such as CFD or Lagrangian particle simulations. Existing CFD data are envisioned to be utilized in conjunction with existing test data for CA development and verification.

II. The fitness landscape module. Fitness may be composed by forming the array product of two state vectors defined as follows: The first is dynamical flow-state vector, denoted as $\phi$, that represents varying environments generated by the CA module introduced above will produce a flow-field state vector of the form:

$$\phi = F[\phi](r,t) = \{\phi_1(r,t), \phi_2(r,t), \ldots, \phi_n(r,t)\}, \tag{1}$$

where the functional notion $F[\phi](r,t)$ expressly indicates the dependence upon the independent variables of space and time. The space variable, denoted by radius vector r includes directional elements in three spatial coördinants described as elements in the mapping domain $r \in \mathbb{R}^3$. Time, denoted as a time scalar t is described as an element in domain $t \in \mathbb{R}$. With respect to these independent variables, optimization ensues to ascertain optimized placement. The functions $\phi_i$ represent environmental variable that change in space and time, e.g., density, velocity, pressure and temperature.

The second state vector involved in generating the fitness landscape characterizes the various possible sensor capabilities and limits, denoted as $\sigma$. In defining this state vector, the $i^{th}$ element is physically conjugate to the $i^{th}$ element of the flow-state vector φ for reasons explained subsequently. The sensor state is described by the relation:

$$\sigma = S^\lambda[\sigma] = \{\sigma_1^{\lambda_1}, \sigma_2^{\lambda_2}, \ldots, \sigma_n^{\lambda_n}\}, \quad (2)$$

where $\sigma_i^{\lambda_i}$ represents the sensor state for its accompanying parameter $\lambda_i$ for each value $i=1,2,\ldots n$.

The sensor state vector σ is considered static in being spatially and temporally independent. However, this vector is parametrically dynamic by affording variation of sensor design through the parameters $\lambda_i$, such as thresholds and sampling fraction. The combination of eqns. (1) and (2) produces a function for application-specific sensor design as well by optimizing upon the design parameters.

The fitness function can be determined, for example, by taking the array product (elemental multiplication) of the sensor and flow terms that are defined as:

$$\Phi[S_\lambda \cdot F(r, t)](r, t; \lambda) \equiv \{\phi_1(r, t)\sigma_1^{\lambda_1}, \phi_2(r, t)\sigma_1^{\lambda_2}, \ldots, \phi_n(r, t)\sigma_n^{\lambda_n}\}, \quad (3)$$

where the parameter vector λ represents the sensor characteristics, which may be combined with the spatial and temporal variations in the flow-field. In this form, the spatial-temporal dependence and the parametric dependencies are shown explicitly. These dependencies constitute the multivariate nature of this problem. Thus, eqn. (3) represents a high-dimensional configuration space that represents all combinations of all possible environmental factors coupled with all relevant sensor characteristics.

Finally, the fitness landscape f is formed by mapping the configuration space Φ onto the real numbers by an appropriate p-norm:

$$f(r, t; \lambda) \equiv \|S_\lambda \cdot F(r, t)\|_p = \|\{\phi_1(r, t)\sigma_1, \phi_2(r, t)\sigma_2, \ldots, \phi_n(r, t)\sigma_n,\}\|_p, \quad (4)$$

where geometrically, f is a high-dimensional surface whose multiple extrema represent positions of optimized placement, orientation and design. The double-bar enclosure denotes the norm magnitude of power value p, typically rendered to be an absolute value. (For example, p1-norm corresponds to addition of first-order terms, p2-norm corresponds to addition of squared terms.) The conjugation yields n-pairs of multiplied values.

III. A genetic algorithm, such as simulated annealing to perform global optimization on the multi-modal landscape. These are known in the art.

IV. GUI based interfaces. These are also known in the art.

In the following, an instantiation of the above procedure is provided by an illustrative example. The flow state vector Φ is defined by performing a two-dimensional (2D)-simulation of the density of agent ρ and the normalized flow velocity, $\hat{v}$ along the edge of an object's surface of interest:

$$\Phi = \{\rho(r, t), \hat{v}(r, t)\}, \quad (5)$$

where r represents a one dimensional vector demarcating the parameter of the object and t, the time chosen to interrogate.

In more general form, the flow state vector can be expressed, similarly to eqn. (1), as:

$$\Phi(r, t; \lambda_f) = \{\phi_1(r, t; \lambda_f), \phi_2(r, t; \lambda_f), \ldots, \phi_m(r, t; \lambda_f)\}, \quad (6)$$

where Φ is the vector representing the flow state, for an m-valued group of such states. The elements in the group $\phi_i$, such that $i=1,2,\ldots m$, are functions of r representing a direction vector, t representing time, and $\lambda_f$ representing parameters within the flow state that remain effectively static in the temporal and spatial boundaries. Examples of such parameters may include molecular weight, thermal conductivity and heat capacity.

The sensor state vector σ is defined by assuming a unidirectional sensor (e.g., sampling tube) that includes a sampling threshold with perfect sampling (i.e., no error occurring). The equation can be represented, differing slightly in form from eqn. (2), as:

$$\sigma = \{\sigma_1(t; \lambda_s), \sigma_2(t; \lambda_s), \ldots, \sigma_n(t; \lambda_s)\}, \quad (7)$$

where σ is the vector representing a sensor state, for an n-valued group of such states. The elements $\sigma_i$, such that $i=1,2,\ldots n$, are functions of t representing time and $\lambda_s$ representing parameters within the sensor state. Examples of such parameters include instrument range, dynamic response and environmental sensitivity.

The first element is chosen to be the inverse of the threshold for reasons to be explained subsequently. The second component is defined to be an outward normal vector $\hat{n}$ perpendicular to the face of the sampling inlet. An example of this circumstance is depicted in FIG. 1.

Figure 1:
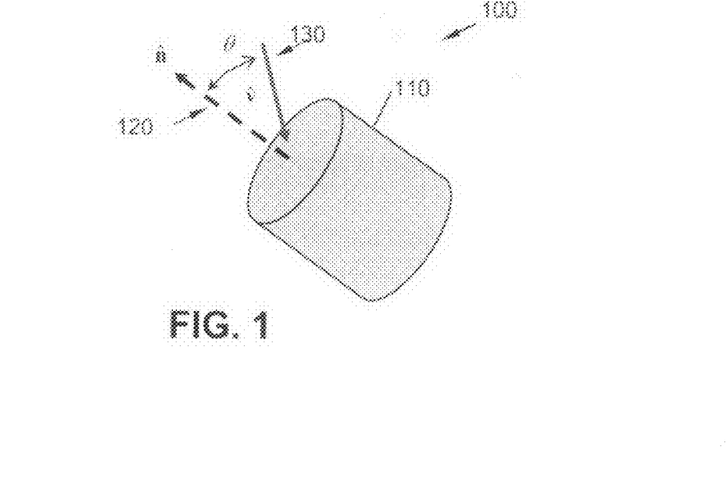
FIG. 1 is an isometric view of a measuring instrument in a flow-field.

In particular, FIG. 1 shows an isometric view of an instrument in a flow-field. The system 100 includes an axi-symmetric measuring instrument 110 having the outward normal vector $\hat{n}$ 120. The instrument 110 is disposed within a flow-field having a streamline vector $\hat{v}$ 130. An angle-of-attack θ (in this example) denotes angular offset between the normal vector $\hat{n}$ 120 and the streamline vector $\hat{v}$ 130.

In simplified form, the fitness function can be obtained through a configuration space array Ω obtained by multiplying the covariant components of the flow state vector and the sensor state vector, such as by the relation:

$$\Omega = \{\phi_i \sigma_i, \ldots, \phi_n \sigma_n\}, \quad (8)$$

and this array can be quantified in the form of a magnitude-denoting scalar within space $\mathbb{R}$ for the p-norm as a fitness function:

$$f(\Omega) \equiv \|\Omega\|_p \in \mathbb{R} \quad (9)$$

An example of this circumstance would include a flow state vector Φ that includes fluid density ρ and normalized velocity $\hat{v}$ from eqn. (5), both of which varying with direction r and time t. With these flow-field elements, a state vector σ may be postulated whose elements couple to eqn. (5) in physically meaningful manner. Consequently, the following 2-tuple definitions are selected:

$$\sigma = \left\{\frac{1}{\rho_T}, \hat{n}\right\}, \quad (10)$$

where the elements include the inverse of the density threshold $\rho_T$ and the normal vector $\hat{n}$.

Evoking eqn. (8), the configuration space array may therefore be defined as all variations of the 2-tuple array product:

$$\Omega = \left\{\frac{\rho(r, t)}{\rho_T}, \hat{v}(r, t) \cdot \hat{n}\right\}, \quad (11)$$

where the elements include a normalized density (relative to its threshold) and a scalar dot-product of the normalized velocity together with the normal vector. The configuration space array includes functions (or alternatively discrete values) for spatial and temporal variations within the flow-field.

Selection of the inverse of the density threshold becomes apparent when the first element of eqn. (11) reaches unit value upon as the sensor detecting a value that reaches (or exceeds) the threshold. (This assumes no error in the model.) Similarly, the dot product between the outward normal $\hat{n}$ and the normalized vector $\hat{v}$ corresponds to a value not greater than a magnitude unit due to the definition of the cosine function, i.e., $$\hat{v}(r, t) \cdot \hat{n} = \cos(\alpha(r, t)), \tag{12}$$

where $\alpha$ represents the angle-of-attack between these vectors. This illustrates engineering judgment involved in assigning conjugate elements. As a result, the sensor state $\sigma$ can be represented as a cosine function accounting for the angle-of-attack, denoted as $\alpha$ that varies as a function of direction r and time t in relation to the normal vector $\hat{n}$.

Mapping the fitness function f involves selecting a norm, with some physical constraints available for guidance. In this notional example, the p2-norm (i.e., the Euclidian norm familiar from Pythagoras' postulate) would lose information regarding the direction of the sensor because negative value of the cosine function would be hidden by square function. Thus, a simple additive fitness function in the p1-norm may be selected in this circumstance for which the sensor points in the opposite direction to the flow (i.e., the fitness diminishes due to the negative values of the cosine function).

For this example, the fitness function $f(r,t;\rho_T)$ varies spatially, temporally and triggered to a threshold. The additive p1-norm selection provides a summation of product components from the flow and sensor state elements expressed as:

$$f = \sum_i |\phi_i \sigma_i|, \text{ such that } i = 1, 2, \tag{13}$$

that can be shown for the above example based on the configuration space array in eqn. (11) and the cosine function in eqn. (12) to be expressed as:

$$f = \frac{\rho(r, t)}{\rho_T} + \cos(\alpha(r, t)), \tag{14}$$

in which the fitness function depends dynamically on space and time. These include, in particular, angle-of-attack $\alpha(r,t)$ and density $\rho(r,t)$.

Figure 2:
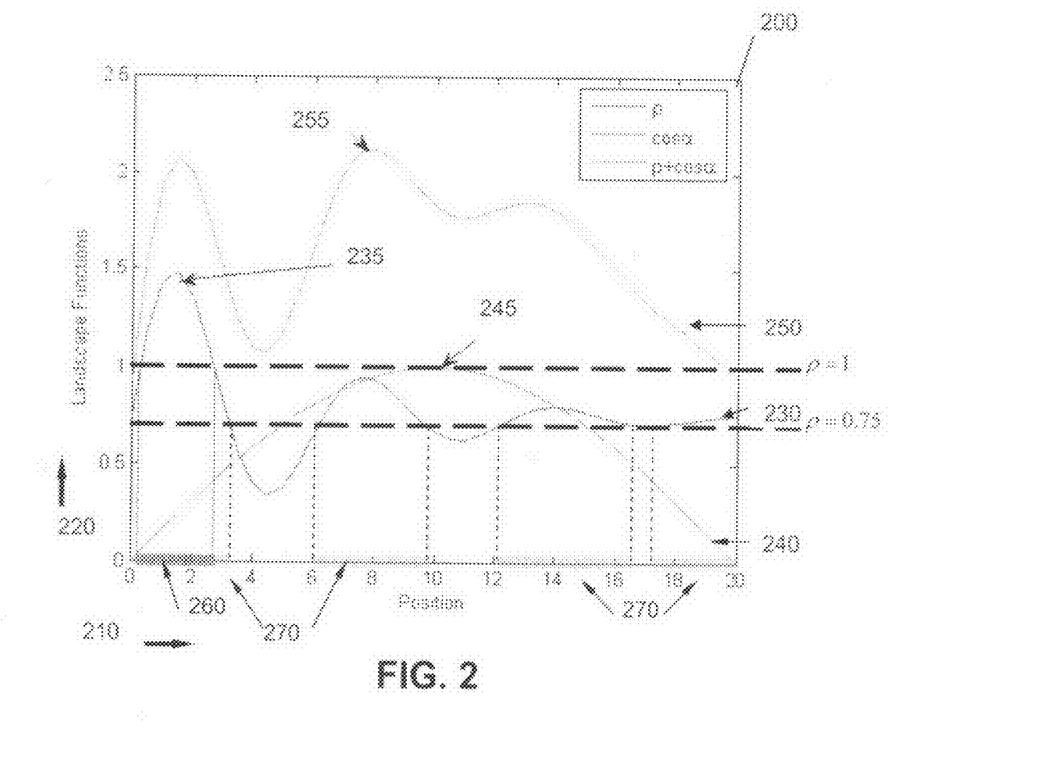
FIG. 2 is a line plot of 1-D-smooth fitness landscapes from eqn. (14)

To illustrate a multi-modal fitness landscape, FIG. 2 shows a plot 200 of landscape functions as a function of position r in a flow-field. The position represents the abscissa 210, with the functions forming the ordinate 220. A one-dimensional density variation may be generated with a damped oscillator function denoted as an oscillating curve 230, having a peak 235 at about position-one. In this example, the threshold value may be momentarily ignored.

A cosine function, denoted by a half-wave curve 240 to model the velocity field as monotonically increasing to its maximum value of unity at mid-position for a peak 245 at position-ten, and then monotonically decreases back to zero at maximum position-twenty. A combined curve 250 denotes the summation of curves 230 and 240, with a peak 255 at about position-seven.

As indicated in FIG. 2, if the common practice of placing a sensor where there is maximal density alone were followed, one would place the sensor somewhere about 1.8 arbitrary distance units from the origin (position-zero). However, when the directionality limitations of the sensor are factored in (assumed here with equal weight), the fitness landscape approach predicts that the extremum is about seven or eight distance units. This is shown in the plot 200 as combined curve 250 representing the sums of the density curve 230 and the cosine curve 240. For a threshold constraint of $\rho_T=1$, FIG. 2 shows that this constraint is only satisfied over the approximate position range between 0.1 and 2.8 indicated by a dark bar 260 on the abscissa 210 for this example.

Thus, optimized placement would return to ~1.8 as was the case with the density-only landscape. For another threshold value chosen as $\rho_T$~0.75, then the fitness landscape for the density may be a piecewise continuous function possessing four maxima over the ranges indicated by the mid-tone bars 270. As before, the coupling yields a selection of about eight distance units as the optimal position.

Another example can be shown for a 3-tuple set of arrays to demonstrate the generality of this approach and its capability to couple sensor design parameters with the dynamical independent variables just explored, a third sensor parameter may be introduced to characterize the sampling fraction; defined to model the ability of air to enter the sensor's inlet port. Thus, the sensor state vector forms the following 3-tuple relation:

$$\sigma = \left\{ \frac{1}{\rho_T}, \hat{n}, \frac{\beta}{2\pi} \right\}, \tag{15}$$

where the sampling fraction term is normalized as $\beta/2\pi$, such that $\beta=2\pi$ is assumed to be optimal (i.e., full-open).

The dimensionality of eqn. (15) implies defining the dimensionality of the flow vector such that the third entry of the latter couples to the sampling fraction model in a physicaly sensible way. By ignoring any back pressure based upon entrance air speed, the flow vector can be expanded by adding an identity operator (of value unity) to its form as follows:

$$\Phi = \{\rho(r;t), \hat{v}(r;t), 1\}, \tag{16}$$

leading to a 3-tuple configuration space array expressed as:

$$\Omega = \left\{ \frac{\rho(r, t)}{\rho_T}, \hat{v}(r, t) \cdot \hat{n}, \frac{\beta}{2\pi} \right\}, \tag{17}$$

where the third element represents the sampling fraction.

Maintaining the additive map for the fitness function, yields:

$$f(r, t; \rho_T, \beta) = \frac{\rho(r, t)}{\rho_T} + \cos(\alpha(r, t)) + \frac{\beta}{2\pi}, \tag{18}$$

such that the fitness function combines density normalized to its threshold, angle-of-attack as expressed by the cosine function, and the sampling fraction.

Figure 3:
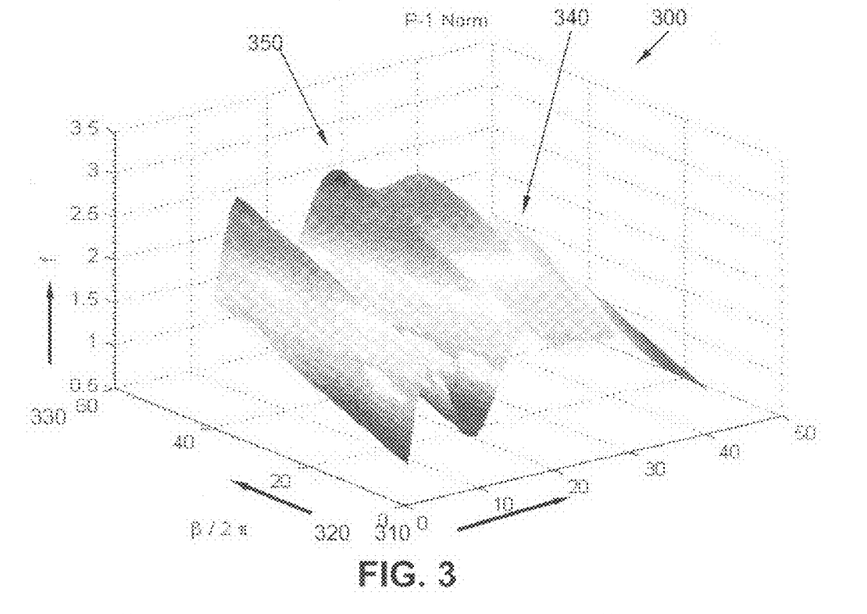
FIG. 3 is an isometric plot of a fitness landscape involving dynamical and design variables from eqn. (19)

FIG. 3 graphically illustrates the multivariate nature of this approach, showing the damped sensitivity-and-directionality landscape of for dependency on spatial position r along with the added dimension associated with the (linear) $\beta$ dependency of the sampling fraction. In particular, FIG. 3 provides an isometric topological plot 300 featuring r as the first planar axis 310, sampling fraction β/2 π as the second planar axis 320 and the fitness function f as the vertical axis 330. The units of the sampling fraction axis 320 are in grid number for this example.

A topological map 340 of the fitness function f shows variation over the planar landscape. The map 340 includes a global maximum 350 at landscape values of 28 and 60 for the first and second planar axes, respectively. As indicated in FIG. 3, the global maximum 350 represents [1] optimized placement and orientation along the spatial r-axis 310 and [2] optimized design indicated here by a maximum sampling fraction along the β-axis 320.

For simplicity, the temporal dependency is not included in the described illustrations of FIGS. 2 and 3. The general surface is actually dynamic, and thus an alternate selection the fitness function for this example would be:

$$f(r, t, \rho_T, \beta) = \frac{\dot{\rho}(r,t)}{\hat{\rho}_T} + \cos(\alpha(r, t)) + \frac{\beta}{2\pi} \quad (19)$$

where $$\dot{\rho}(r, t) \equiv \frac{d\rho}{dt}$$

is the time rate of change in the density ρ, and $\hat{\rho}_T = \rho_T/\tau$ is the threshold density divided by an accumulation time τ. Thus, the algorithm may involve generating surfaces at different intervals of time and monitoring their differences.

Figure 4:
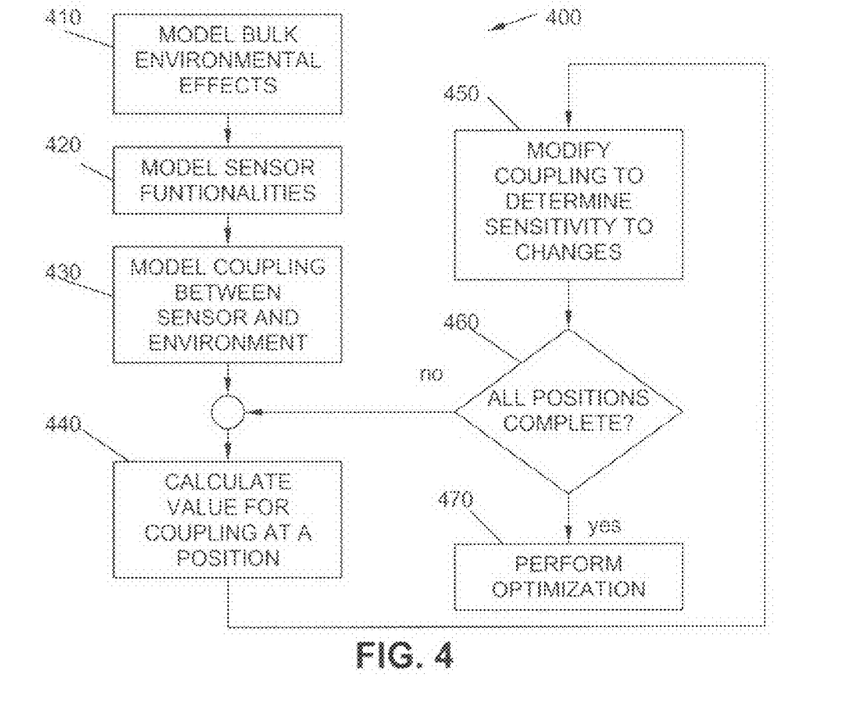
FIG. 4 is a flowchart describing the procedural steps for the algorithm.

The logic of the proposed tool and underlying algorithm is shown in FIG. 4 illustrating a flowchart 400. The procedure begins with step 410 to develop adequate models to simulate bulk environmental effects, followed by step 420 to develop models for key sensor functionalities. Subsequently, at step 430 the process continues to model the physical coupling between the sensor functionalities and the environment.

In particular, at step 430, the resulting functions depend upon the variables over which optimization will be performed. Additionally, at step 430, the algorithm correlates directly with the performance areas delineated above. The process continues at step 440 to calculate a measure of value for the present state of the coupling and record. Then the process proceeds at step 450 to modify the coupling.

This modification may be accomplished by any combination of: (a) displacing the sensor, (b) changing the environment; and/or (c) affecting a sensor design modification. Subsequently, a query at step 460 is performed to determine whether all desired variations have been evaluated. A negative response returns the process to repeat step 440 until satisfaction of the query at step 460, from which the process proceeds to step 470 to perform optimization with a standard genetic algorithm over the set of all values derived in step 440. The algorithm pivots upon steps 440 and 450 where a value is assigned to the different possible configurations by employing a concept—inspired by theoretical biology—known as fitness.

Figure 5:
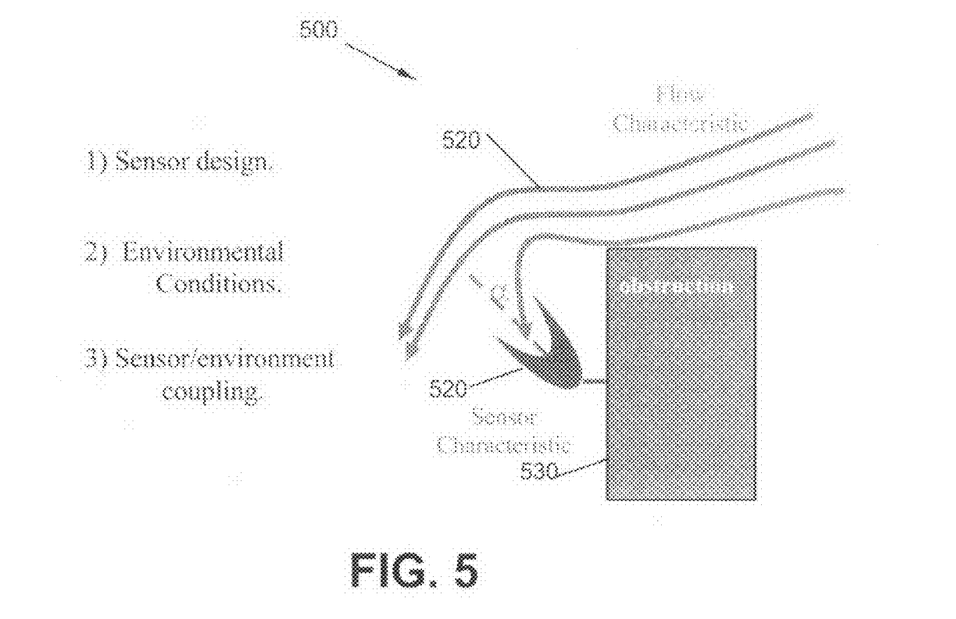
FIG. 5 is an elevation view of a measuring instrument in a flow-field.

FIG. 5 shows an augmented elevation view adapted from FIG. 1. In particular, the system 500 includes streamlines 510 from a flow-field and a sensor 520 embedded therein. Additionally, an obstruction 530 presents an obstacle to a non-inviscid (i.e., viscous) flow-field, thereby inhibiting direct flow-stream measurement by the sensor 520. Consequently, the flow presented to the sensor at its orientation approaches at an angle-of-attack α.

Figure 6:
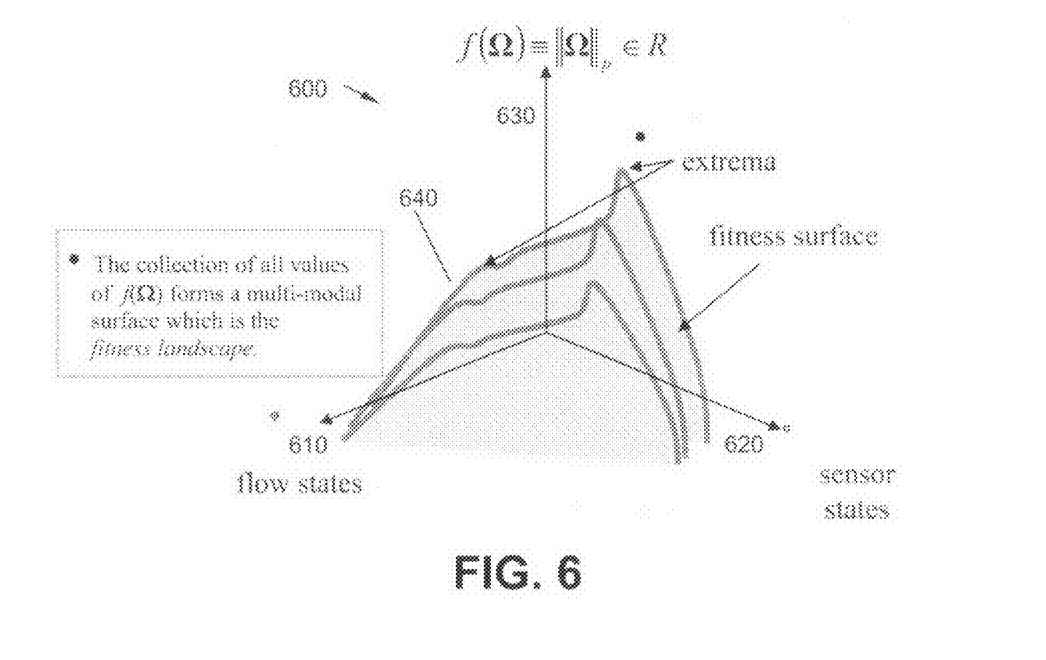
FIG. 6 is a generic isometric topological map.

FIG. 6 shows an isometric vector diagram for a generic topological map 600. The planar coordinates are represented by the flow state axis 610 and the sensor state axis 620. The vertical component is represented by the fitness function axis 630. Several discrete curves 640 can be mapped as functions of the flow and sensor state variables to form a topological map. Local and global extrema 650 can be determined based on selected criteria for particular condition regimes or ranges on the map.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method that simulates performance using modules that include cellular automata (CA), fitness landscape, generic algorithm and a graphical interface for disposing of a sensor in an environment, the method comprising:
   modeling a first plurality of environment elements $\phi_i$ from i=1, . . . , n corresponding to conditions of the environment to form a flow-field state vector $\Phi=\{\phi_1(r,t), \phi_2(r,t), \ldots, \phi_n(r,t)\}$, such that each element $\phi_i$ is a function of independent variables of position vector r and time t, such that at least one of the environment elements includes spatial and temporal variation;
   modeling a second plurality of sensor elements $\sigma_i^\lambda$ from i=1, . . . , n, corresponding to characteristic functionalities of the sensor to form a sensor state vector $\sigma=\{\sigma_1^\lambda, \ldots, \sigma_n^\lambda\}$, such that parameter vector λ represents sensor characteristics;
   covariantly coupling the environmental elements of the first plurality with the sensor elements of the second plurality to produce a third plurality of configuration elements forming a configuration space array $\Omega=\{\phi_i\sigma_i, \ldots, \phi_n\sigma_n\}$;
   combining the configuration elements to obtain a fitness function parameter, wherein at least one of the environment elements is a first vector array being covariant with a corresponding at least one of the sensor elements that is a second vector array, such that coupling the first vector array with the second vector array produces a scalar; and
   outputting the configurations elements to the graphical interface.

2. The method according to claim 1, further comprising:
   adjusting at least one of the environment elements and the sensor elements; and
   repeating operations for covariantly coupling and combining until the fitness function parameter is obtained over a defined region of the environment within a fourth plurality of fitness function parameters.

3. The method according to claim 2, further comprising:
   determining an extreme value within the fourth plurality of fitness function parameters.

4. The method according to claim 3, wherein determining includes optimizing the fitness function parameter as an optimum value with a genetic algorithm over the fourth plurality of fitness function parameters.

5. The method according to claim 1, wherein combining the configuration elements includes summing scalar values of the third plurality of configuration elements.

6. The method according to claim 1, wherein combining the configuration elements includes summing absolute scalar products of the environment elements and the sensor elements to obtain a fitness function parameter f such that $$f = \sum_{l=1}^{n} |\phi_l \sigma_l^\lambda|$$

as the third plurality of configuration elements.

7. The method according to claim 1, wherein combining the configuration elements includes summing squared scalar values of the third plurality of configuration elements.

8. The method according to claim 1, wherein the fitness function employs a Royal Roads Fitness Function.

9. The method according to claim 6, wherein the configuration space array can be defined as $$\Omega = \left\{ \frac{\rho(r,t)}{\rho_T}, \hat{v}(r,t) \cdot \hat{n} \right\},$$

such that $\rho(r,t)$ is local dynamic fluid density, $\rho_T$ is threshold density, $\hat{v}(r,t)$ is normalized local dynamic velocity and $\hat{n}$ is the normal vector of the sensor such that $\hat{v}(r,t) \cdot \hat{n} = \cos(\alpha(r,t))$ where $\alpha(r,t)$ is dynamic angle of attack of the sensor, and a local dynamic fitness function can be expressed as $$f = \frac{\rho(r,t)}{\rho_T} + \cos(\alpha(r,t)).$$

10. A system that simulates performance using modules that include cellular automata (CA), fitness landscape, and generic algorithm for disposing of a sensor in an environment, the system comprising:
a graphical interface;
an environment modeler for modeling a first plurality of environment elements $\phi_i$ from i=1, ..., n corresponding to conditions of the environment, to form a flow-field state vector $\Phi = \{\phi_1(r,t), \phi_2(r,t), ..., \phi_n(r,t)\}$, such that each element $\phi_i$ is a function of independent variables of position vector r and time t, such that at least one of the environment elements includes spatial and temporal variation;
a sensor modeler for modeling a second plurality of sensor elements $\sigma_i^\lambda$ from i=1, ..., n, corresponding to characteristic functionalities of the sensor to form a sensor state vector $\sigma = \{\sigma_1^\lambda, ..., \sigma_n^\lambda\}$, such that parameter vector $\lambda$ represents sensor characteristics;
a coupler for covariantly coupling the environmental elements of the first plurality with the sensor elements of the second plurality to produce a third plurality of configuration elements forming a configuration space array $\Omega = \{\phi_i \sigma_i, ..., \phi_n \sigma_n\}$;
a combiner for combining the configuration elements to obtain a fitness function parameter, wherein at least one of the environment elements is a first vector array being covariant with a corresponding at least one of the sensor elements that is a second vector array, such that coupling the first vector array with the second vector array produces a scalar; and
an output unit for outputting the configurations elements to the graphical interface.

11. The system according to claim 10, further comprising:
a parameter adjuster for adjusting at least one of the environment elements and the sensor elements; and
an operation processor for repeating operations for covariantly coupling and combining until the fitness function parameter is obtained over a defined region of the environment within a fourth plurality of fitness function parameters.

12. The system according to claim 11, further comprising:
a determiner for determining an extreme value within the fourth plurality of fitness function parameters.

13. The system according to claim 12, wherein the determiner includes an optimizer for obtaining an optimum fitness function parameter with a genetic algorithm over the fourth plurality of fitness function parameters.

14. The system according to claim 10, wherein the combiner for combining the configuration elements includes a summation implementer for summing scalar values of the third plurality of configuration elements.

15. The system according to claim 10, wherein the combiner for combining the configuration elements includes a summation implementer for summing absolute scalar products of the environment elements and the sensor elements to obtain a fitness function parameter f such that $$f = \sum_{l=1}^{n} |\phi_l \sigma_l^\lambda|$$

as the third plurality of configuration elements.

16. The system according to claim 10, wherein the combiner for combining the configuration elements includes a summation implementer for summing squared scalar values of the third plurality of configuration elements.

17. The system according to claim 10, wherein the fitness function employs a Royal Roads Fitness Function.

18. The system according to claim 15, wherein the configuration space array can be defined as $$\Omega = \left\{ \frac{\rho(r,t)}{\rho_T}, \hat{v}(r,t) \cdot \hat{n} \right\},$$

such that $\rho(r,t)$ is local dynamic fluid density, $\rho_T$ is threshold density, $\hat{v}(r,t)$ is normalized local dynamic velocity and $\hat{n}$ represents the normal vector of the sensor such that $\hat{v}(r,t) \cdot \hat{n} = \cos(\alpha(r,t))$ where $\alpha(r,t)$ is dynamic angle of attack of the sensor, and a local dynamic fitness function can be expressed as $$f = \frac{\rho(r,t)}{\rho_T} + \cos(\alpha(r,t)).$$

* * * * *